(12) United States Patent
Horiguchi et al.

(10) Patent No.: US 8,137,627 B2
(45) Date of Patent: Mar. 20, 2012

(54) HYDROGEN GENERATOR AND FUEL STICK

(75) Inventors: Toshio Horiguchi, Tokyo (JP); Robert W. Reeve, Wiltshire (GB); Darren P. Scattergood, Hampshire (GB)

(73) Assignee: Qinetiq Limited (GB)

( * ) Notice: Subject to any disclaimer, the term of this patent is extended or adjusted under 35 U.S.C. 154(b) by 0 days.

(21) Appl. No.: 12/717,584

(22) Filed: Mar. 4, 2010

(65) Prior Publication Data
US 2010/0226829 A1   Sep. 9, 2010

Related U.S. Application Data

(63) Continuation of application No. PCT/JP2008/065582, filed on Aug. 29, 2008.

(30) Foreign Application Priority Data

Sep. 5, 2007 (JP) .................................. 2007-230486

(51) Int. Cl.
*B01J 19/00* (2006.01)
*C01B 3/02* (2006.01)
*C06B 31/28* (2006.01)

(52) U.S. Cl. ........ 422/108; 422/239; 422/111; 422/129; 423/656; 423/648.1; 149/22; 149/46

(58) Field of Classification Search ................. 422/111, 422/129, 108; 423/648.1, 656; 149/22, 46
See application file for complete search history.

(56) References Cited

U.S. PATENT DOCUMENTS

| | | | |
|---|---|---|---|
| 3,419,361 A | 12/1968 | Bratton et al. | |
| 4,055,632 A | 10/1977 | Hoffman et al. | |
| 4,157,927 A | 6/1979 | Chew et al. | |
| 4,270,360 A | 6/1981 | Nakane et al. | |
| 4,315,786 A | 2/1982 | English et al. | |
| 4,468,263 A | 8/1984 | Artz et al. | |
| 5,006,920 A | 4/1991 | Schafer | |
| 5,037,518 A | 8/1991 | Young et al. | |
| 5,702,491 A | 12/1997 | Long et al. | |
| 5,817,157 A | 10/1998 | Checketts | |
| 6,274,093 B1 | 8/2001 | Long et al. | |
| 7,052,658 B2 | 5/2006 | Arthur et al. | |
| 7,094,487 B2 | 8/2006 | Desgardin et al. | |
| 7,261,748 B2 | 8/2007 | Jones et al. | |
| 7,505,161 B2 | 3/2009 | Kathan et al. | |
| 7,682,411 B2 | 3/2010 | Jones et al. | |
| 2004/0065395 A1 | 4/2004 | Desgardin et al. | |

(Continued)

FOREIGN PATENT DOCUMENTS

FR     2011354     2/1970

(Continued)

OTHER PUBLICATIONS

International Search Report dated Dec. 2, 2008.

(Continued)

*Primary Examiner* — Kaity V. Handal
(74) *Attorney, Agent, or Firm* — McDonnell Boehnen Hulbert & Berghoff LLP

(57) ABSTRACT

A hydrogen generator includes a plurality of fuel sticks each of which includes a hydrogen release compound configured to generate hydrogen by a chemical reaction, a pressure-resistant container configured to store therein the plurality of fuel sticks, and a controller configured to carry out control in such a manner that hydrogen is generated selectively from the plurality of fuel sticks.

8 Claims, 4 Drawing Sheets

U.S. PATENT DOCUMENTS

| | | |
|---|---|---|
| 2004/0131904 A1 | 7/2004 | Arthur et al. |
| 2005/0142404 A1 | 6/2005 | Boucher et al. |
| 2005/0180916 A1 | 8/2005 | Autrey et al. |
| 2005/0227136 A1 | 10/2005 | Kikuchi et al. |

FOREIGN PATENT DOCUMENTS

| | | |
|---|---|---|
| FR | 2906805 | 4/2008 |
| GB | 2165532 | 4/1986 |
| JP | 61-97101 | 5/1986 |
| JP | 2002-161997 | 6/2002 |
| JP | 2004-68896 | 3/2004 |
| JP | 2004-519400 | 7/2004 |
| JP | 2005-321490 | 11/2005 |
| WO | WO 02/18267 | 3/2002 |
| WO | WO 02/18267 A1 | 3/2002 |
| WO | WO 03/084866 | 10/2003 |
| WO | WO 2004/092675 | 10/2004 |
| WO | WO 2007/032742 | 3/2007 |
| WO | WO 2007/088923 | 8/2007 |
| WO | WO 2007/098271 | 8/2007 |
| WO | WO 2008/066486 | 6/2008 |

OTHER PUBLICATIONS

U.S. Appl. No. 12/681,996, filed Jun. 11, 2010 entitled: Improvements in Hydrogen Generators.

U.S. Appl. No. 12/865,467, filed Jul. 30, 2010 entitled: Hydrogen Generator and Fuel Pellet.

US 8,137,627 B2

HYDROGEN GENERATOR AND FUEL STICK

CROSS REFERENCE TO RELATED APPLICATIONS

This is a Continuation Application of PCT Application No. PCT/JP2008/065582, filed Aug. 29, 2008, which was published under PCT Article 21(2) in Japanese.

This application is based upon and claims the benefit of priority from prior Japanese Patent Application No. 2007-230486, filed Sep. 5, 2007, the entire contents of which are incorporated herein by reference.

BACKGROUND OF THE INVENTION

1. Field of the Invention

The present invention relates to a hydrogen generator configured to generate hydrogen gas which can be supplied to a fuel cell used to generate electric energy, and a fuel stick used for the hydrogen generator.

2. Description of the Related Art

In portable information devices such as a cellular phone, PDA, digital camera, and the like, a rechargeable battery such as a lithium-ion cell or the like has been mainly used as the power source. In recent years, with the demand for high functionality, multifunctionality, high speed, and long-time operation, a small-sized fuel cell is anticipated as a new power source, and trial manufacture and experimentation have been initiated.

Unlike a conventional rechargeable battery, a fuel cell requires no charging, and it is possible to bring a device into a state where the device can be operated for a long time simply by supplying fuel or replacing the fuel cartridge. Of the available fuel cells, due to the characteristics of a hydrogen-fuel cell using hydrogen as the fuel, which enables a high energy density, application of the hydrogen fuel cell to portable information devices or the like has been studied with a view towards obtaining a fuel cell of similar capacity in terms of peak load capacity as conventional rechargeable batteries. Particularly, in the case of portable information devices, the method of storing hydrogen in a compact and light form is the key to success.

In U.S. Patent Application Publication No. 2005/0227136, filling hydrogen into a tank constituted of a hydrogen storage alloy to use the hydrogen is proposed. However, the hydrogen storage alloy is heavy and the size of the container becomes large, and hence the hydrogen storage alloy is not suitable for portable information devices. Further, when the hydrogen stored in the hydrogen storage alloy is used up, it is necessary to refill the tank with hydrogen by some method. Accordingly, there is a problem that the infrastructure for such purpose must be provided.

In order to solve the problems associated with the hydrogen storage alloy, in WO 02/18267, a hydrogen generator configured to generate hydrogen by thermally decomposing a substance containing much hydrogen, such as ammonia borane, is proposed. According to this method, hydrogen is generated from a solid fuel, and hence a tank made of a large, heavy hydrogen storage alloy is not needed, and it is unnecessary to newly prepare the infrastructure for filling gaseous hydrogen into the hydrogen storage alloy.

BRIEF SUMMARY OF THE INVENTION

According to an aspect of the present invention, there is provided a hydrogen generator comprising:

a plurality of fuel sticks each of which includes a hydrogen release compound configured to generate hydrogen by a chemical reaction;

a pressure-resistant container configured to store therein the plurality of fuel sticks; and a controller configured to carry out control in such a manner that hydrogen is generated selectively from the plurality of fuel sticks.

According to another aspect of the present invention, there is provided a fuel stick including a hydrogen release compound configured to generate hydrogen by a chemical reaction, comprising:

an exothermic resistive element arranged in the center of the fuel stick, and configured to generate heat by causing a current to flow therethrough;

an exothermic compound arranged outside the exothermic resistive element, and configured to generate heat by the exothermic resistive element, and heat the hydrogen release compound;

the hydrogen release compound arranged outside the exothermic compound, and configured to generate hydrogen; and a porous heat insulating material arranged outside the hydrogen release compound, and permeable to hydrogen, wherein an external shape thereof is one of a cylindrical shape and shape of a hexagonal cylinder.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

The best mode for carrying out the present invention will be described below with reference to the drawings.

First Embodiment

Figure 1A:
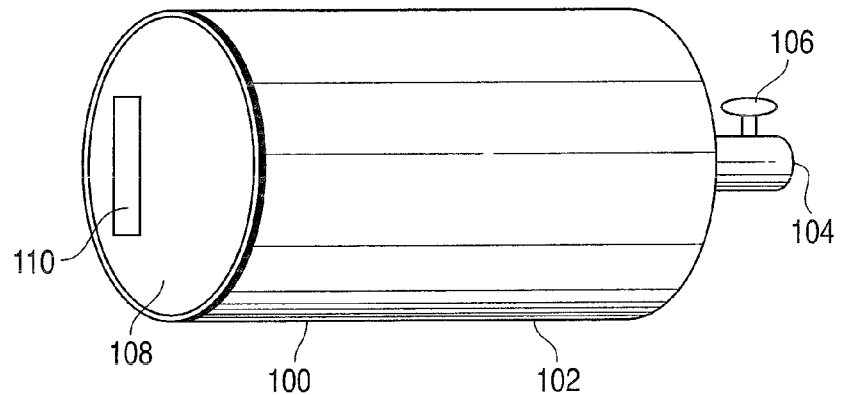
FIG. 1A is a perspective view showing the external appearance of a hydrogen generator according to a first embodiment of the present invention.

As shown in FIG. 1A, a hydrogen generator 100 according to a first embodiment of the present invention includes a cylindrical outer case 102. A hydrogen generation port 104, which is a port from which hydrogen is generated from the hydrogen generator 100, is provided to protrude from a central part of one end of the outer case 102 in the longitudinal direction. A stop valve 106 is provided at a midway position of the hydrogen generation port 104. A controller 108 is arranged on the other end side of the outer case 102. A connector 110 is provided at a part of the controller 108.

The outer case 102 is a pressure-resistant container constituted of a high-electric conductivity metal such as iron or aluminum. A hydrogen-fuel cell (not shown) is connected to the end of the hydrogen generation port 104, and the hydrogen-fuel cell generates electricity by using hydrogen generated by the hydrogen generator 100. The stop valve 106 is closed before the hydrogen-fuel cell is connected to the hydrogen generation port 104, and is opened after the hydrogen-fuel cell is connected.

An operation of the hydrogen generator 100 is controlled by the controller 108. The controller carries out communication with a control section of an apparatus which uses the hydrogen generator 100, for example, a cellular phone through the connector 110, and the operation of the hydrogen generator 100 is determined.

Figure 1B:
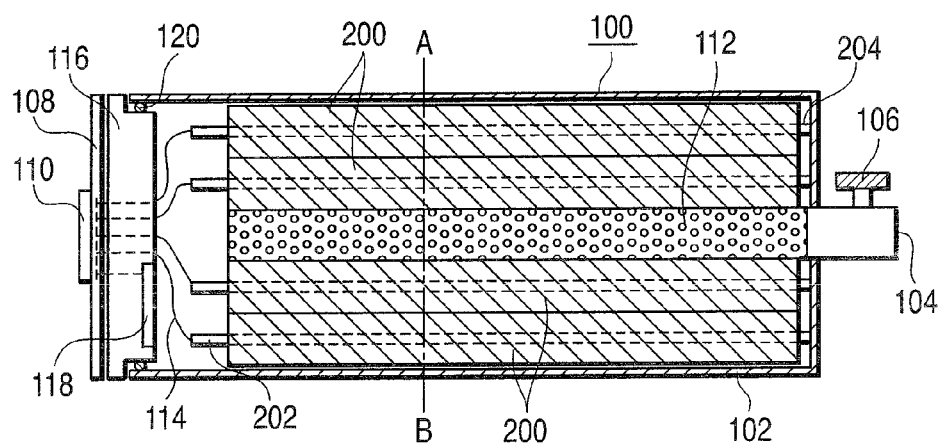
FIG. 1B is a cross-sectional view of the hydrogen generator cut in the longitudinal direction.
Figure 1C:
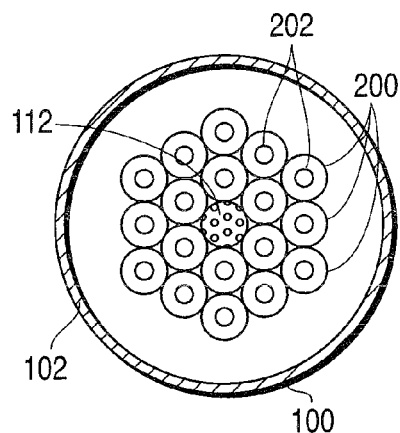
FIG. 1C is a cross-sectional view cut along line A-B in FIG. 1B.

As shown in FIGS. 1B and 1C, in the hydrogen generator 100, a carbon filter 112 with a cylindrical external shape is arranged in the center thereof in the axial direction, and a plurality of, for example, several tens of fuel sticks 200 with a cylindrical external shape are concentrically arranged around the filter 112. Note that the hatching in FIGS. 1B and 1C, and other cross-sectional views is added to clarify the differences between the members, and not to express the materials specified in, for example, U.S. Patent Drawing Regulations.

Here, the carbon filter 112 is constituted of porous graphite. The carbon filter 112 is positioned in the center of the plurality of fuel sticks 200, and one end thereof in the longitudinal direction is connected to the hydrogen generation port 104 through the stop valve 106. By the arrangement described above, impurities other than hydrogen generated when the hydrogen is generated are absorbed, and only pure hydrogen flows through the hydrogen generation port 104.

Each of the fuel sticks 200 includes a terminal 202 configured to supply a voltage to the fuel stick 200 on one end side thereof, and rear terminal 204 on the other end side. Each of the fuel sticks 200 is arranged inside the outer case in such a manner that the rear terminal is brought into contact with the outer case 102.

A lead wire 114 is connected to the terminal 202 of each fuel stick 200. These lead wires 114 penetrate a plug 116 functioning as a lid of the hydrogen generator 100, and are connected to the controller 108 arranged on the outer surface of the plug 116. In order to maintain the airtightness of the inside of the hydrogen generator 100, the lead wires 114 are formed integral with the plug 116 when the plug 116 is molded by using a resin. Alternatively, after forming a hole in the molded plug 116, and passing the lead wires 114 through the hole, the hole may be filled with a sealant. It is desirable that these lead wires 114 be not directly connected to the controller 108, but be connected thereto through a connector, not shown. By employing such a configuration, it is possible to detach the controller 108 from the hydrogen generator 100 to attach the controller 108 to another hydrogen generator after all the fuel sticks 200 in the hydrogen generator 100 are used up. That is, it becomes possible to reuse the controller 108.

Further, a pressure sensor 118 is arranged on the inner surface side of the plug 116. An output of the pressure sensor 118 is also connected to the controller 108 by penetrating the plug 116 in a similar manner. The pressure sensor is, for example, a diaphragm type sensor, and is provided with a function of measuring the pressure inside the hydrogen generator 100, and transmitting the measured value to the controller 108.

It should be noted that the plug 116 serves as a lid of the hydrogen generator 100. In this case, an O-ring 120 constituted of synthetic rubber is attached to the plug 116 in a circumferential form. The O-ring 120 is brought into contact with the outer case of the hydrogen generator 100, whereby the airtightness of the inside of the hydrogen generator 100 is maintained.

Figure 2A:
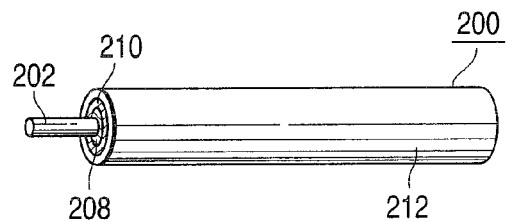
FIG. 2A is a perspective view showing the external appearance of a fuel stick.
Figure 2B:
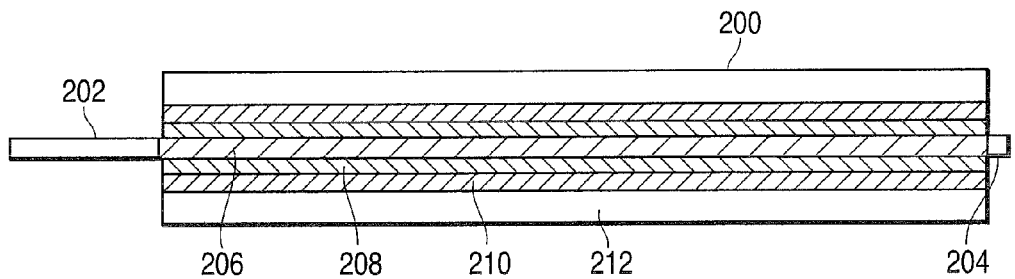
FIG. 2B is a cross-sectional view of the fuel stick cut in the longitudinal direction.

As shown in FIGS. 2A and 2B, an exothermic resistive element 206 is provided in the center of the fuel sticks 200. The exothermic resistive element 206 is configured to convert electric energy of a current flowing therethrough into thermal energy, and is constituted of a material equivalent to that for an electric heater or the like. Both ends of the exothermic resistive element 206 are the terminal 202 and rear terminal 204.

The outside of the exothermic resistive element 206 is thinly and uniformly coated with heat mix 208. An example of this heat mix 208 is a mixture of lithium aluminum hydride ($LiAlH_4$) and ammonium chloride ($NH_4Cl$). This mixture is an exothermic compound which becomes, when supplied with a little external heat or the like, a heat source that generates heat by itself. Further, the above mixture generates a certain amount of hydrogen as described below, and hence the mixture functions not only as a heat source but also as a hydrogen release compound:

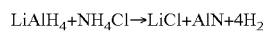

$$LiAlH_4 + NH_4Cl \rightarrow LiCl + AlN + 4H_2$$

This heat mix 208 can be applied by a method of pressing the heat mix material against the circumference of the exothermic resistive element 206.

The outside of the heat mix 208 is also uniformly coated with ammonia borane 210 in a similar manner. The ammonia borane 210 can also be applied by applying pressure thereto in a similar manner. However, the thickness of the coat of ammonia borane 210 applied is larger than that of the heat mix 208.

The outside of the ammonia borane 210 is coated with a heat insulating material 212. The heat insulating material 212 is constituted of a material provided with air permeability, such as glass fiber (e.g., aerogel or the like), porous ceramic, and the like. That is, the heat insulating material 212 is permeable to hydrogen. The heat insulating material 212 prevents the heat generated at the hydrogen generation time from being conducted to an adjacent fuel stick 200, and further prevents the heat from being conducted to the outside of the outer case 102.

Here, the above ammonia borane 210 will be described below. Ammonia borane ($NH_3BH_3$) is a substance containing about 20 wt % of hydrogen, and is a hydrogen release compound that generates hydrogen by thermal decomposition. Ammonia borane is easy to handle, is a solid, is not explosive, and serves as a stable hydrogen source. Ammonia borane in the same volume as liquid hydrogen contains twice as much mass of hydrogen as liquid hydrogen. Ammonia borane is a substance which is normally powdery, and can be formed into a hard pellet form, stick form, conical form, and the like by applying pressure as the need arises. By raising the temperature, ammonia borane is thermally decomposed in three stages, thereby generating hydrogen. When heated, ammonia borane is melted at about 110° C. to become a liquid, and generates hydrogen of a single molecule. The reaction formula at that time is as follows, and this is the first stage hydrogen generation reaction:

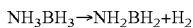

This reaction is an exothermic reaction. Accordingly, the temperature of the ammonia borane itself is raised, and the process proceeds to the second stage reaction. The temperature of the $NH_2BH_2$ produced by the first stage reaction is further raised, and hydrogen of a single molecule is generated at about 150° C. The reaction formula at that time is as follows, and this is the second stage hydrogen generation reaction:

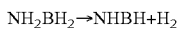

This reaction is also an exothermic reaction, and heat of an amount required to raise the temperature of the NHBH to a temperature at which the NHBH can carry out thermal decomposition of the third stage is theoretically generated. When the temperature exceeds about 480° C., the NHBH generates hydrogen of a single molecule. The reaction formula at that time is as follows, and this is the third stage hydrogen generation reaction:

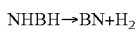

Theoretically, this third stage reaction also generates heat of a sufficient amount required to completely carry out the thermal decomposition.

As described above, by heating the ammonia borane 210, one molecule of the ammonia borane generates three molecules of hydrogen.

Next, the fundamental operation of hydrogen generation of the hydrogen generator 100 of this embodiment will be described below.

It is assumed that, as described previously, the hydrogen fuel cell is connected to the end of the hydrogen generation port 104, and the stop valve 106 is opened.

When a predetermined voltage is applied to the terminal 202 of one fuel stick 200 between the terminal 202 and outer case 102, the outer case 102 and rear terminal 204 of the fuel stick 200 are in contact with each other, and hence a current flows through the exothermic resistive element 206 of the fuel stick 200 of interest. Accordingly, when the predetermined voltage is applied for a fixed period of time, the exothermic resistive element 206 of the fuel stick 200 of interest generates heat to heat the heat mix 208, and the ammonia borane 210 is heated by the heat, whereby hydrogen is generated. At this time, hydrogen is generated also from the heat mix 208, although the amount is small. The generated hydrogen is passed through the heat insulating material 212, is further passed through the carbon filter 112 located in the center of the hydrogen generator 100, and is then discharged from the hydrogen generation port 104.

The plug 116 is fitted in the outer case 102 through the O-ring 120, and the airtightness is maintained up to an internal pressure value set by the capability of the O-ring 120. Accordingly, even when the internal pressure of the hydrogen generator 100 becomes higher by the hydrogen generation, the hydrogen does not leak from the gap between the plug 116 and outer case 102, and all the generated hydrogen is discharged to the outside from the hydrogen generation port 104 through the carbon filter 112.

Next, the operation sequence of the hydrogen generation of this embodiment will be described below.

Figure 3:
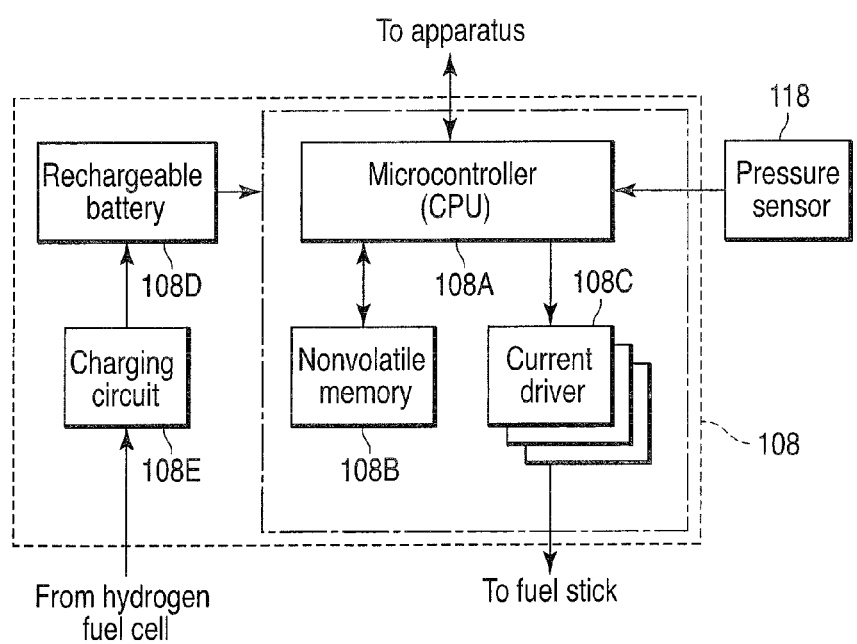
FIG. 3 is a block configuration diagram of a controller of the hydrogen generator.

As shown in FIG. 3, the controller 108 described above includes a microcontroller 108A, a nonvolatile memory 108B, current drivers 108C, a rechargeable battery 108D, and a charging circuit 108E. The microcontroller 108A performs overall control of the hydrogen generator 100, and is constituted of a one-chip microcomputer provided with functions of a CPU, memory, input/output port, and the like in an integrated form. The nonvolatile memory 108B is used to record a usage state of each fuel stick 200, and is constituted of an electrically rewritable memory such as an EEPROM, flash memory, and the like. The current driver 108C is configured to, in order to raise the temperature of each fuel stick 200, make a current flow through the exothermic resistive element 206 in the center of the fuel sticks 200. The rechargeable battery 108D is configured to supply a power source to the controller 108, and is constituted of a lithium-ion cell or nickel-hydrogen cell. It should be noted that in FIG. 3, the part surrounded by an alternate long and short dash line is an electronic circuit to be supplied with a power source by the rechargeable battery 108D. Further, the charging circuit 108E charges the rechargeable battery 108D by the power supplied from the hydrogen fuel cell to which the hydrogen generator 100 is connected.

The nonvolatile memory 108B is configured so that the microcontroller 108A can read/write information from/to the memory 108B. Memory addresses of the nonvolatile memory 108B are assigned to the memory sticks 200 in such a manner that usage states of the fuel sticks 200 are recorded on memory addresses to which the fuel sticks 200 correspond on a one-to-one basis. Accordingly, it becomes possible for the microcontroller 108A, by specifying one address of the nonvolatile memory 108B, to set the usage state of the fuel stick 200 corresponding to the address, and check the usage state thereof. Examples of indication of the usage state of the nonvolatile memory 108B are a value FFH of the memory in the hexadecimal number indicating "unused", 80H indicating "used", 00H indicating "fuel stick 200 uninserted", and the like. When the microcontroller 108A searches for an unused fuel stick 200, it is sufficient for the microcontroller 108A if the microcontroller 108A scans the contents of the nonvolatile memory 108B to search for a fuel stick 200 indicated by FFH.

As described above, by using a nonvolatile memory 108B as a memory used to record the state of the fuel stick 200, it is possible to detach the hydrogen generator 100 from the hydrogen fuel cell to connect the detached hydrogen generator 100 to another hydrogen fuel cell in a state where not all the fuel sticks 200 are used up. In this case too, it is possible for the microcontroller 108A to know which of the fuel sticks 200 is unused, which raises the efficiency.

Figure 4:
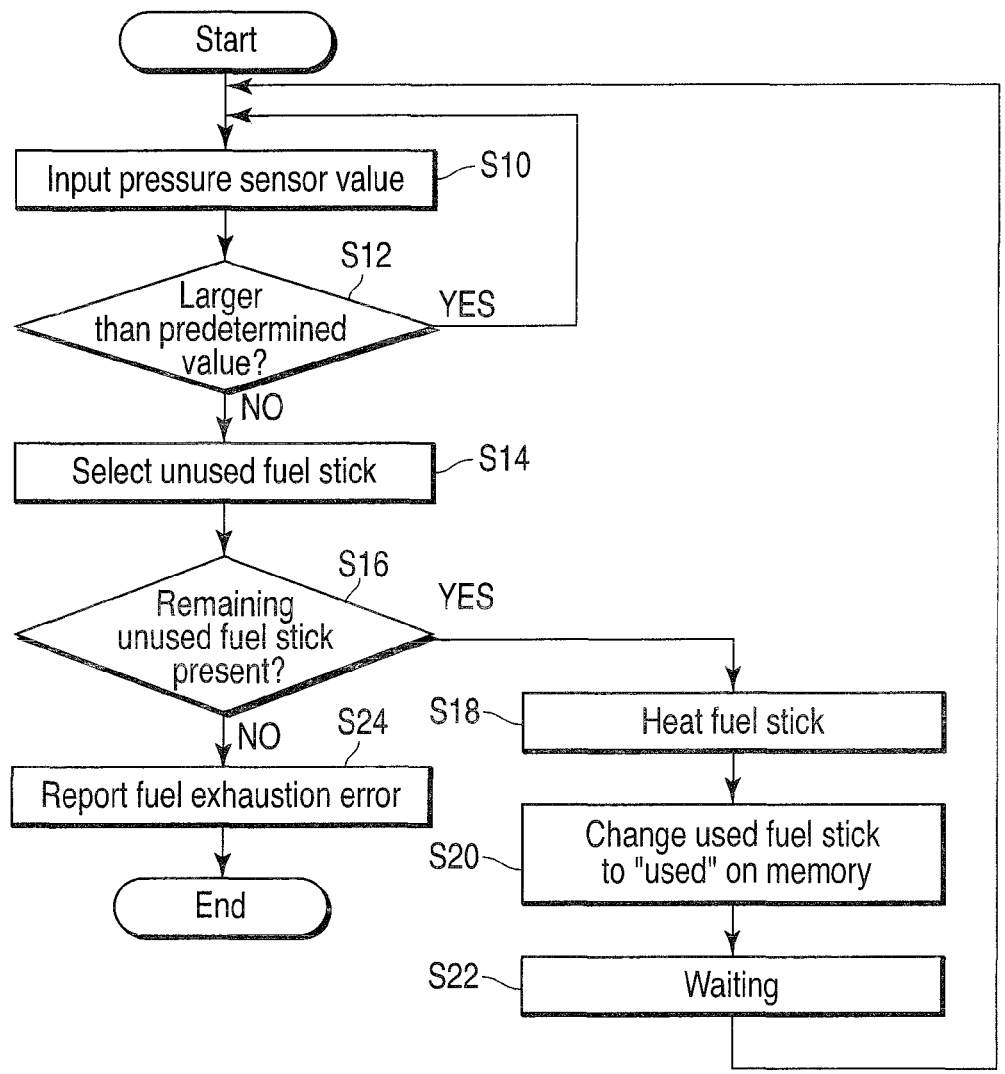
FIG. 4 is a view showing a flowchart of the operation sequence of a microcontroller in the controller.

An operation sequence of (a CPU of) the microcontroller 108A will be described below with reference to FIG. 4.

First, the microcontroller 108A inputs a value of the pressure sensor 118 (step S10). At this time, by inputting the value of the pressure sensor 118 a plurality of times, and taking the average of the values, it is also possible to reduce the influence of noise.

Then, the microcontroller 108A determines whether or not the input value of the pressure sensor 118 is larger than a predetermined value (step S12). This predetermined value is a limit value of the hydrogen amount that enables the hydrogen fuel cell to which the hydrogen generator 100 is connected to continue generating electricity. That is, when the hydrogen pressure inside the hydrogen generator 100 becomes smaller than the predetermined value, the hydrogen fuel cell becomes unable to continuously generate electricity unless hydrogen is newly generated. If the hydrogen pressure within the hydrogen generator 100 is larger than the specified value, i.e., the hydrogen pressure is sufficient, this implies that a state in which supply of hydrogen from the hydrogen generator 100 can be maintained can be continued. Accordingly, when it is determined in step S12 that the value of the pressure sensor 118 is larger than the predetermined value ("YES" in the flowchart), the microcontroller 108A returns to the processing of inputting the value of the pressure sensor in step S10.

Conversely, when it is determined in step S12 that the value of the pressure sensor 118 is not larger than the predetermined value ("NO" in the flowchart), the microcontroller 108A scans the contents of the nonvolatile memory to search for an unused fuel stick 200 (step S14). Further, as a result of this, it is determined whether or not an unused fuel stick 200 is present (step S16). Here, when it is determined that an unused fuel stick 200 is present ("YES" in the flowchart), an operation of generating hydrogen from the corresponding fuel stick 200 is started (step S18). That is, a current driver 108C corresponding to the above unused fuel stick 200 is driven to make a prescribed current flow through an exothermic resistive element 206 of the fuel stick 200. Then, the value of the nonvolatile memory 108B of a memory address corresponding to the used fuel stick 200 is rewritten from "unused" to "used" (step S20). Although in step S18, hydrogen generation is started from the fuel stick 200, a certain length of time is required to achieve the actual hydrogen generation. Accordingly, after waiting for a fixed period of time (step S22), the flow is returned to above step S10.

In the manner described above, as long as an unused fuel stick 200 is present, hydrogen is generated continuously while the fuel sticks are switched from one to another. Further, when all the fuel sticks 200 have been used up, it is determined in step S16 that all the fuel sticks 200 have been used up, and no unused fuel stick 200 is present ("NO" in the flowchart). In this case, the microcontroller 108A reports occurrence of a fuel exhaustion error to the host apparatus using the hydrogen generator 100 (step S24).

It should be noted that although the fuel exhaustion error is reported when no unused fuel stick 200 is present, it goes without saying that a small remaining fuel amount warning may be reported when the number of unused fuel sticks 200 becomes small.

As described above, according to the hydrogen generator 100 associated with the first embodiment, by using the fuel stick 200 formed by processing the hydrogen release compound such as ammonia borane or the like into a stick-like shape, it becomes possible to efficiently use the space inside the hydrogen generator 100 and, consequently, reduce the size of the hydrogen generator 100.

Further, each of the stick-like hydrogen release compound members is separated from the other stick-like hydrogen release compound members by the heat insulating material, and hence it becomes possible to eliminate the influence of heat generated at the hydrogen generation time on the other members.

Further, by measuring the pressure inside the hydrogen generator 100 by means of the pressure sensor 118, it becomes possible to respond to a hydrogen generation request on demand.

Second Embodiment

Next, a hydrogen generator according to a second embodiment of the present invention will be described.

The external appearance of a hydrogen generator according to this embodiment is identical to that of the hydrogen generator 100 according to the first embodiment shown in FIG. 1A.

Figure 5:
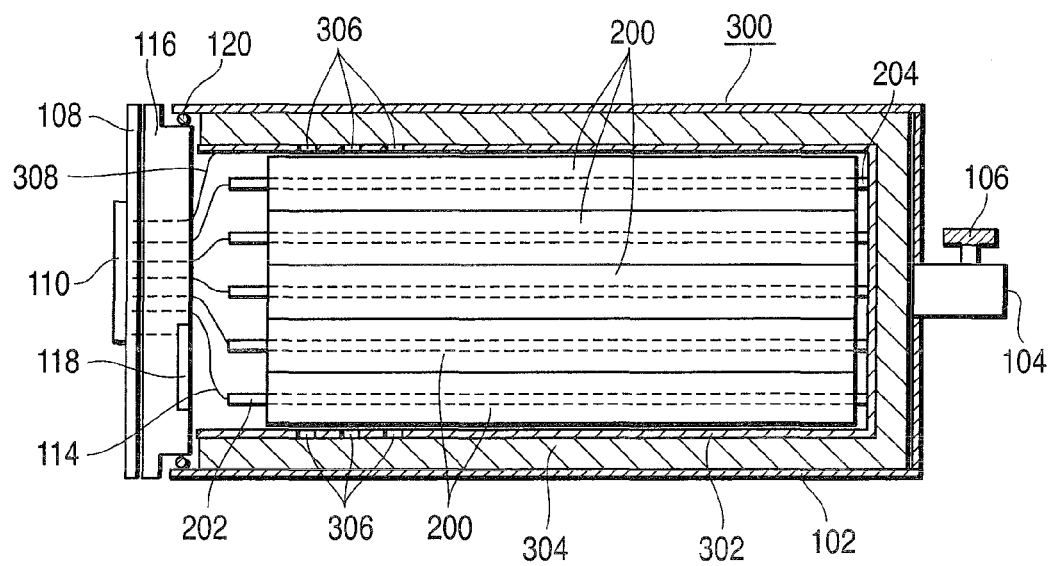
FIG. 5 is a cross-sectional view of a hydrogen generator according to a second embodiment of the present invention.

FIG. 5 is a cross-sectional view of a hydrogen generator 300 according to the second embodiment. It should be noted that parts having the same functions as the hydrogen generator 100 according to the first embodiment are denoted by the same reference symbols as those of the first embodiment, and a description of them are omitted.

In the hydrogen generator 300 according to this embodiment, an inner case 302 is arranged inside an outer case 102. Further, in place of the cylindrical carbon filter 112 in the hydrogen generator 100 according to the first embodiment, a carbon filter 304 packed into a space between the inner case 302 and outer case 102 is provided. A plurality of vent holes 306 are provided in the inner case 302 in a circumferential form, and the inner case 302 and a connector 110 are connected to each other by a GND wire 308.

A hydrogen generation port 104 is a cylindrical pipe attached to the outer case 102, and is in contact with the carbon filter 304. Further, like in the hydrogen generator 100 according to the first embodiment, a stop valve 106 is provided at a connection part to be connected to a hydrogen fuel cell (not shown). Fuel sticks 200 with a cylindrical external shape are arranged in a circumferential form and encased in the inner case 302, and a rear terminal 204 of each fuel stick 200 is brought into contact with the inner case 302, whereby each fuel stick 200 is brought into a state where there is an electrical connection between the fuel stick 200 and inner case 302. As described in the first embodiment, a predetermined current can be made to flow to a terminal 202 of each fuel stick 200 by the control of a controller 108.

Next, the principle of hydrogen generation in the hydrogen generator 300 according to the second embodiment will be described below.

When a predetermined current flows to the terminal 202 of the fuel stick 200, an exothermic resistive element 206 of the fuel stick 200 generates heat, the heat mix 208 is heated, and the ammonia borane 210 is also heated, whereby hydrogen is generated. The generated hydrogen is passed through a heat insulating material 212 of the fuel stick 200, thereafter is passed through the vent holes 306 of the inner case 302 and carbon filter 304, thereafter reaches the hydrogen generation port 104, and is then supplied to the hydrogen fuel cell connected to the end of the port 104. Here, the vent holes 306 are arranged at a position far from the hydrogen generation port 104, and hence the temperature of the generated hydrogen is sufficiently lowered while the hydrogen is passed through the carbon filter 304, thereby making it possible to make the temperature of the hydrogen a temperature at which the hydrogen can be supplied to the hydrogen fuel cell as it is without any problem.

In this embodiment, too, hydrogen generation from each fuel stick 200 is controlled by sensing the internal pressure by the same configuration/sequence as the first embodiment, and a description of the operation is therefore omitted.

According to the hydrogen generator 300 associated with the second embodiment, the same advantage as that of the hydrogen generator 100 according to the first embodiment can be obtained.

The present invention has been described above on the basis of the embodiments. However, the present invention is not limited to the embodiments described above and, it goes without saying that the invention can be variously modified or applied within the scope of the gist of the present invention.

Figure 6:
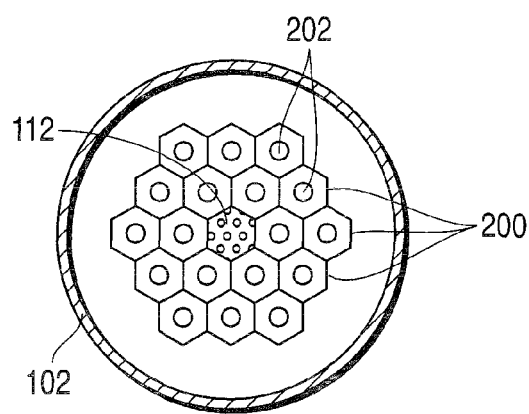
FIG. 6 is a cross-sectional view of a hydrogen generator used to explain another aspect of the fuel stick.

For example, although the shape of the fuel stick 200 is made cylindrical, the shape may be a hexagonal cylinder with a cross section of a regular hexagon as shown in FIG. 6. By employing such a configuration, spaces between cylindrical columns can be effectively utilized. Accordingly, even with the same volume, it is possible to store a larger amount of ammonia borane 210, and increase the amount of generated hydrogen larger. It should be noted that in this case too, it is necessary for the shape of the outer case 102 to be that of a pressure-resistant container, and hence it is desirable that the shape of the outer case 102 be cylindrical.

Further, although the hydrogen generation port 104 is arranged on the opposite side of the plug 116, it is also possible to arrange the hydrogen generation port 104 on the same side as the plug 116 if the space on the plug 116 side is rearranged.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A hydrogen generator comprising:
    a plurality of fuel sticks each of which includes a hydrogen release compound configured to generate hydrogen by a chemical reaction;
    a pressure-resistant container configured to store therein the plurality of fuel sticks; and
    a controller configured to carry out control in such a manner that hydrogen is generated selectively from the plurality of fuel sticks, wherein at least one fuel stick includes:
    an exothermic resistive element arranged in the center of the fuel stick, and configured to generate heat by causing a current to flow therethrough;
    an exothermic compound arranged outside the exothermic resistive element, and configured to generate heat by the exothermic resistive element, and heat the hydrogen release compound; the hydrogen release compound arranged outside the exothermic compound, and configured to generate hydrogen; and
    a porous heat insulating material arranged outside the hydrogen release compound, and permeable to hydrogen, and an external shape of the fuel stick is one of a cylindrical shape and shape of a hexagonal cylinder.

2. The hydrogen generator according to claim 1, wherein the pressure-resistant container is cylindrical.

3. The hydrogen generator according to claim 1, further comprising:
    a pressure sensor configured to measure the pressure inside the pressure-resistant container, wherein the controller includes:
    a control section configured to carry out control in such a manner that, when a value of the pressure measured by the pressure sensor has lowered to a value equal to or lower than a predetermined value, hydrogen generation from a new fuel stick is started; and
    a nonvolatile memory configured to record thereon a usage state of each fuel stick.

4. The hydrogen generator according to claim 3, wherein the controller is arranged when hydrogen is required to (i) search for an unused fuel stick and (ii) determine whether or not an unused fuel stick exists and, if so (iii) to ignite the fuel stick.

5. The hydrogen generator according to claim 3, wherein the controller is arranged to report a fuel exhaustion error when all the fuel sticks are used up.

6. The hydrogen generator according to claim 3, wherein the controller is arranged to report a warning when the number of unused fuel sticks becomes small.

7. The hydrogen generator according to claim 3, wherein the non-volatile memory is arranged to record all of the following states for each fuel stick: unused and used and uninserted.

8. A fuel stick including a hydrogen release compound configured to generate hydrogen by a chemical reaction, comprising:
    an exothermic resistive element arranged in the center of the fuel stick, and configured to generate heat by causing a current to flow therethrough;
    an exothermic compound arranged outside the exothermic resistive element, and configured to generate heat by the exothermic resistive element, and heat the hydrogen release compound; the hydrogen release compound arranged outside the exothermic compound, and configured to generate hydrogen; and
    a porous heat insulating material arranged outside the hydrogen release compound, and permeable to hydrogen, wherein an external shape thereof is one of a cylindrical shape and shape of a hexagonal cylinder.

* * * * *